United States Patent
Midorikawa

(10) Patent No.: US 11,704,820 B2
(45) Date of Patent: Jul. 18, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Waki Midorikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 14 days.

(21) Appl. No.: 17/123,172

(22) Filed: Dec. 16, 2020

(65) Prior Publication Data
US 2021/0201511 A1 Jul. 1, 2021

(30) Foreign Application Priority Data
Dec. 25, 2019 (JP) .............................. JP2019-234368

(51) Int. Cl.
*G06T 7/33* (2017.01)
*G06T 7/12* (2017.01)
*G06T 11/00* (2006.01)
*G06T 7/80* (2017.01)

(52) U.S. Cl.
CPC ................ *G06T 7/337* (2017.01); *G06T 7/12* (2017.01); *G06T 7/80* (2017.01); *G06T 11/00* (2013.01)

(58) Field of Classification Search
None
See application file for complete search history.

(56) References Cited

U.S. PATENT DOCUMENTS

| 10,121,262 | B2 | 11/2018 | Katchalov | |
|---|---|---|---|---|
| 2006/0017837 | A1* | 1/2006 | Sorek | H04N 5/235 348/E5.034 |
| 2008/0253660 | A1* | 10/2008 | Matsushita | G06V 30/166 382/190 |
| 2009/0028446 | A1* | 1/2009 | Wu | G06V 30/268 382/229 |
| 2018/0174326 | A1* | 6/2018 | Katchalov | G06T 7/337 |
| 2021/0321974 | A1* | 10/2021 | Wang | A61B 8/02 |

* cited by examiner

*Primary Examiner* — Yanna Wu
(74) *Attorney, Agent, or Firm* — Carter, DeLuca & Farrell LLP

(57) ABSTRACT

To improve user convenience as to adjustment for vibration correction of a captured image captured by an image capturing apparatus, a feature portion evaluation unit refers to feature portions selected by a feature portion selection unit and determines whether feature portions necessary for vibration isolation have been acquired from a reference image. The feature portion evaluation unit has the function of notifying information about the feature portions of the reference image in a case where the acquired feature portions do not satisfy a predetermined condition, that is, in a case where the reliability of the acquired feature portions does not reach a predetermined level.

13 Claims, 6 Drawing Sheets

| | ID | (x, y) COORDINATES | ANGLE |
|---|---|---|---|
| 610 | 0 | 200, 800 | 0 |
| 611 | 1 | 1500, 600 | 91 |
| 612 | 2 | 3000, 600 | 91 |
| 613 | 3 | 500, 1200 | 89 |
| 614 | 4 | 2600, 1200 | 89 |
| 615 | 5 | 3800, 1100 | 1 |
| 616 | 6 | 1000, 1600 | 90 |
| 617 | 7 | 3300, 1400 | 1 |
| 618 | 8 | 2600, 1900 | 88 |

FIG.6A

| | GROUP | NUMBER |
|---|---|---|
| 630 | 0 | 3 |
| 631 | 90 | 6 |

FIG.6B

IMAGE PROCESSING APPARATUS, IMAGE PROCESSING METHOD, AND STORAGE MEDIUM

BACKGROUND

Field

The present disclosure relates to a technique for processing information used for vibration correction of images.

Description of the Related Art

A so-called free viewpoint video generation system is currently in actual use. The free viewpoint video generation system combines multi-viewpoint images obtained through capturing by a number of image capturing apparatus and generates video from a virtual viewpoint (referred to as virtual viewpoint video or free viewpoint video) uncapturable from a position of each image capturing apparatus. To combine multi-viewpoint images without displacement and generate virtual viewpoint video, all image capturing apparatus generating multi-viewpoint images to be materials for virtual viewpoint video must be kept in orientations corresponding to extrinsic parameters of the image capturing apparatus calculated at the time of calibration of the image capturing apparatus.

U.S. Pat. No. 10,121,262 discloses a method of isolating vibrations by correcting captured video obtained from a vibrating image capturing apparatus. In the method disclosed in U.S. Pat. No. 10,121,262, a vibration correction amount is estimated by matching a common image area (feature portion) of a frame of captured video to that of a reference image obtained through capturing in the orientation of the image capturing apparatus at the time of calibration. An image captured in the orientation at the time of calibration of the image capturing apparatus will be hereinafter referred to as a reference image.

A reference image needs to be captured and selected prior to capturing of a material image used for virtual viewpoint video. However, an object seen in a reference image may change at the time of capturing of a material image. For example, an object that was present at the time of capturing a reference image may be absent at the time of capturing a material image. If a feature portion based on a captured image of such an object is used for estimation of a vibration correction amount, there is a possibility of an error in correction.

In addition, a feature portion may be based on an image of an unstable object such as an instrument or equipment that remains present in a material image but is likely to move or vibrate, instead of an image of a substantially non-changing object such as a building or a line of a field. If there are a lot of unstable feature portions, that is, feature portions whose positions are different in a reference image and a material image, the influence of the unstable feature portions cannot be completely excluded even by performing statistical processing, which may result in an erroneous vibration correction.

To remove the error in vibration correction described above, it is considered that information used for vibration correction such as feature portions detected from images is presented to a user to facilitate system adjustment. However, there is a problem that it takes time and effort to display feature portions recognized in the system uniformly and cause a user to verify validity and reliability of all feature portions of several tens or hundreds image capturing apparatus.

SUMMARY

The present disclosure relates to an image processing apparatus comprising: an acquisition unit configured to acquire a captured image from an image capturing apparatus; a selection unit configured to select feature portions, which are image areas used for alignment of the captured image with a different captured image of the image capturing apparatus, in the captured image acquired by the acquisition unit based on edge intensities in the image areas; and a presentation unit configured to present information about reliability of the feature portions.

Further features of the present disclosure will become apparent from the following description of exemplary embodiments with reference to the attached drawings.

BRIEF DESCRIPTION OF THE DRAWINGS

FIG. 6A is a diagram showing an example of feature portion information output by the image processing apparatus according to the embodiment; and FIG. 6B is a diagram showing an example of feature portion information output by the image processing apparatus according to the embodiment.

DESCRIPTION OF THE EMBODIMENTS

Embodiments of the present disclosure will be hereinafter described in detail with reference to the drawings.

First Embodiment

Figure 1:
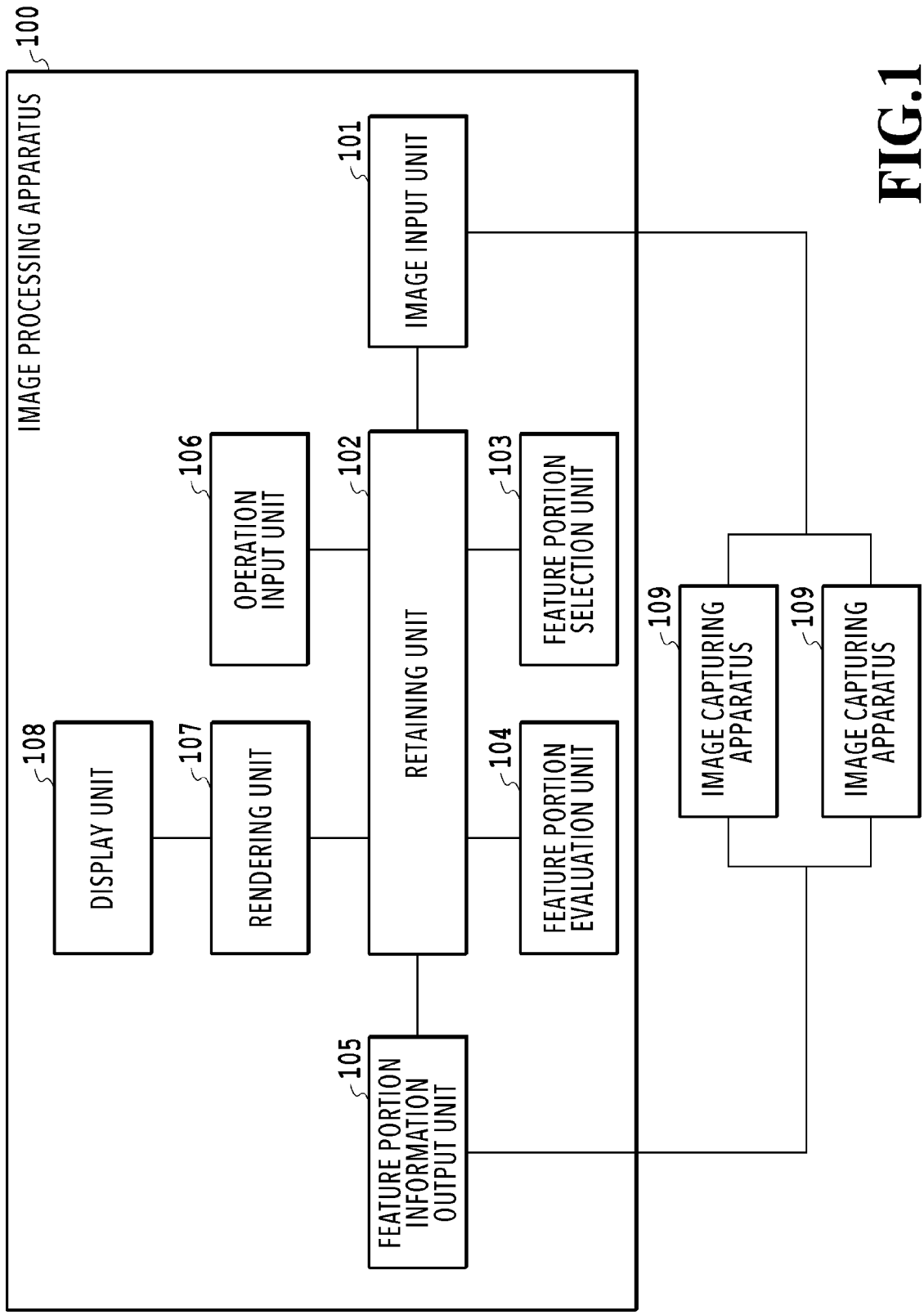
FIG. 1 is a functional block diagram of an image processing apparatus according to an embodiment.

FIG. 1 is a functional block diagram showing an example of a configuration of an image processing apparatus 100 according to the embodiment.

An image processing apparatus 100 according to an embodiment of the present disclosure comprises an image input unit 101, a retaining unit 102, a feature portion selection unit 103, a feature portion evaluation unit 104, a feature portion information output unit 105, an operation input unit 106, a rendering unit 107, and a display unit 108. Based on a plurality of captured images from a plurality of image capturing apparatus 109 and a designated condition, the image processing apparatus 100 can select a feature portion for alignment of images used for vibration isolation of video of each image capturing apparatus 109 and present information about reliability of the feature portion.

The image input unit 101 receives one or more captured images including a reference image from each image capturing apparatus 109 and stores them in the retaining unit 102. The feature portion selection unit 103 selects a feature portion from the reference image and outputs, to the retaining unit 102, the feature portion and information about the position of the feature portion and an angle of a representative edge (hereinafter simply referred to as an edge angle) in the image area of the feature portion. In a case where a plurality of edges are detected in the image of the feature portion, an edge having the highest edge intensity among the edges is determined to be a representative edge. In the present embodiment, the edge angle is 0° in the vertical direction. The feature portion evaluation unit 104 refers to the feature portion selected by the feature portion selection unit 103 and determines whether a feature portion necessary for vibration isolation has been acquired from the reference image. The feature portion evaluation unit 104 has the function of notifying an error with respect to the reference image in a case where the acquired feature portion does not satisfy a predetermined condition, that is, in a case where the reliability of the acquired feature portion does not reach a predetermined level.

Further, in the present embodiment, the rendering unit 107 has the function of acquiring the reference image and feature portion information about the position and edge angle of the feature portion, rendering an object indicating the feature portion information in the reference image, and displaying it on the display unit 108.

In the present embodiment, a user can see the information displayed on the display unit 108 and instruct the image processing apparatus 100 whether to adopt the feature portion used for vibration isolation of video via the operation input unit 106. In this case, the feature portion selection unit 103 reselects a feature portion based on the user instruction, outputs it to the retaining unit 102, and updates the feature portion information. The feature portion information output unit 105 outputs the selected feature portion information to a control module of an image capturing apparatus 109 which performs vibration isolation control of captured video. The control module of the image capturing apparatus 109 searches an area around the feature portion in the captured image (frame of captured video) for an area matching a feature included in the feature portion information using a known method based on the acquired feature portion information. The control module of the image capturing apparatus 109 can perform vibration isolation of captured video by making correction such that the coordinates of the matching area in the frame correspond to those in the reference image.

Figure 2:
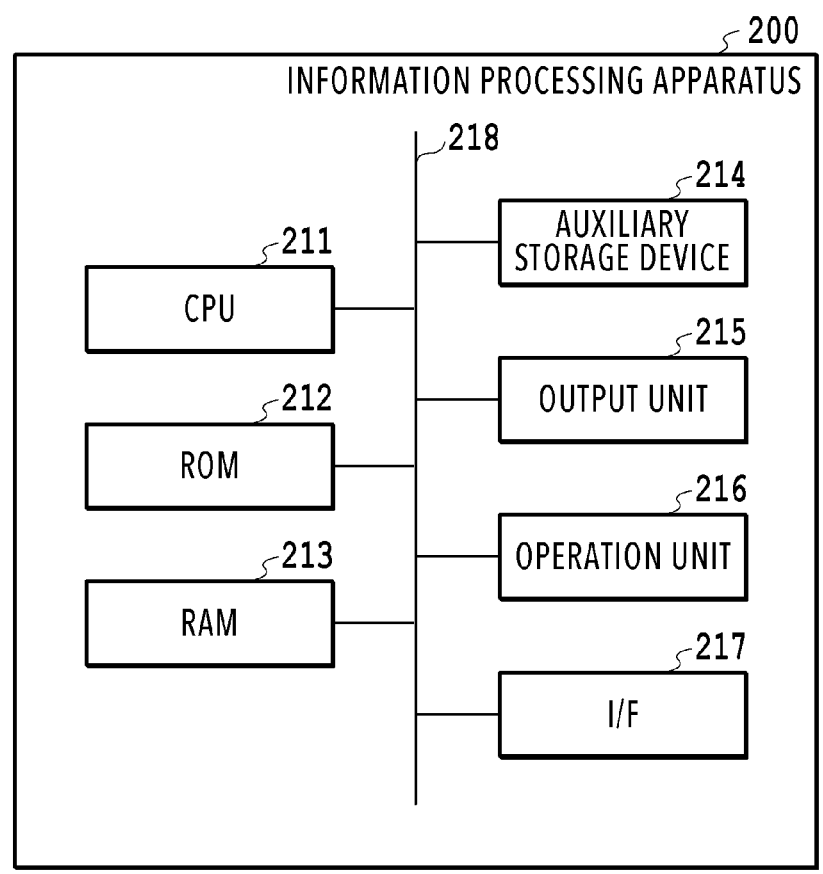
FIG. 2 is a hardware configuration diagram of an information processing apparatus which implements the image processing apparatus according to the embodiment.

FIG. 2 shows a hardware configuration diagram of an information processing apparatus 200 which implements the image processing apparatus 100 according to the embodiment. The information processing apparatus 200 comprises a CPU 211, a ROM 212, a RAM 213, an auxiliary storage device 214, an output unit 215, an operation unit 216, a communication I/F 217, and a bus 218.

The CPU 211 uses a computer program and data stored in the ROM 212 and the RAM 213 to implement control of each unit of the information processing apparatus 200. The image processing apparatus 100 may be implemented by an information processing apparatus having one or more types of dedicated hardware different from the CPU 211 and at least part of the processing by the CPU 211 may be executed by dedicated hardware separate from the information processing apparatus 200. Examples of the dedicated hardware include an application-specific integrated circuit (ASIC), a field-programmable gate array (FPGA), and a digital signal processor (DSP).

The ROM 212 stores, for example, a program requiring no change. The RAM 213 temporarily stores, for example, a program supplied from the auxiliary storage device 214, data used for operation of each functional block of the image processing apparatus 100, and data externally output via the communication I/F 217. The auxiliary storage device 214 used as the retaining unit 102 includes, for example, a hard disk drive, and stores data such as captured images and user settings used for determination of a feature portion.

The output unit 215 used as the display unit 108 includes, for example, a liquid crystal display or an LED, and displays a graphical user interface (GUI) for user operation of the information processing apparatus 200 and a processing result of the information processing apparatus 200. The operation unit 216 including the operation input unit 106 includes, for example, a keyboard, mouse, joystick, and touch panel, and inputs various instructions to the CPU 211 in response to user operation. The CPU 211 operates as a display control unit which controls the output unit 215 and an operation control unit which controls the operation unit 216.

The communication I/F 217 is used to communicate with an external apparatus of the information processing apparatus 200. For example, in the case of wired connection between the image processing apparatus 100 and an external apparatus, a communication cable is connected to the communication I/F 217. In a case where the information processing apparatus 200 has the function of wirelessly communicating with an external apparatus, the communication I/F 217 comprises an antenna. The bus 218 connects the units in the information processing apparatus 200 to each other and transfers information.

In the present embodiment, the output unit 215 and the operation unit 216 are present inside the image processing apparatus 100. However, at least one of the output unit 215 and the operation unit 216 may be present as a different apparatus outside the information processing apparatus 200.

Figure 3:
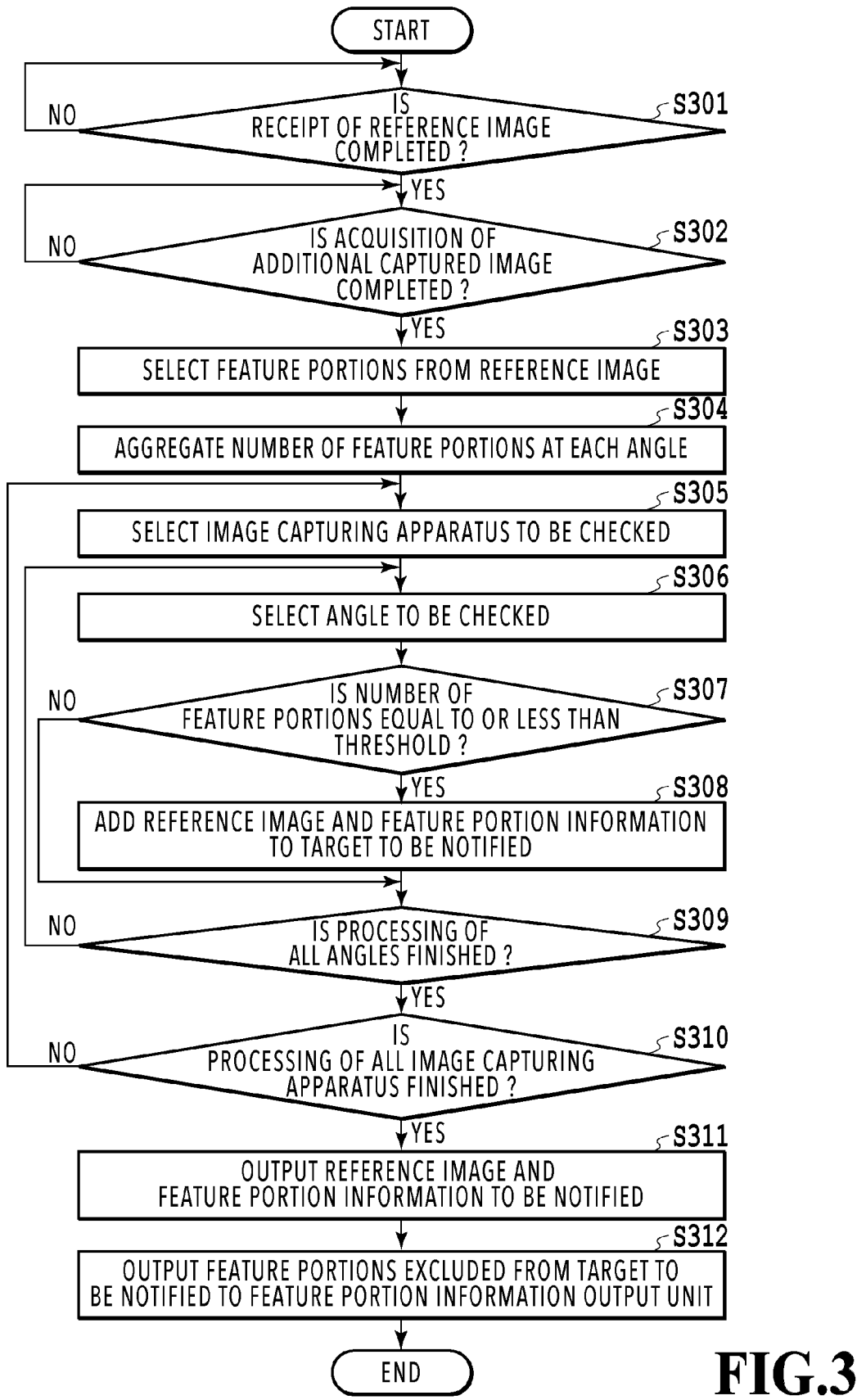
FIG. 3 is a flowchart of processing performed by the image processing apparatus according to the embodiment.

FIG. 3 shows a flowchart of processing performed by the image processing apparatus 100 according to the present embodiment.

In S301, the image input unit 101 receives a reference image of at least one image capturing apparatus 109 and stores it in the retaining unit 102.

In S302, in a case where an additional captured image can be used for selection of feature portions in addition to the reference image, the image input unit 101 acquires the additional captured image and stores it in the retaining unit 102. The additional captured image may be acquired from an external image capturing apparatus 109 or generated by the image processing apparatus 100.

In S303, the feature portion selection unit 103 acquires the reference image from the retaining unit 102, selects feature portions of the reference image, and outputs feature portion information to the retaining unit 102. The feature portions may be selected by, for example, dividing the reference image into latticed image areas, detecting an edge in each image area, and selecting areas in which an edge having an edge intensity higher than a predetermined edge intensity is detected.

In S304, the feature portion evaluation unit 104 aggregates the number of feature portions selected in S303 for each group having a predetermined edge angle. The present embodiment uses the method of aggregating the number of feature portions classified into groups having edge angles corresponding to predetermined directions used for vibration correction and making a notification in a case where the number of feature portions in each group is equal to or less than a predetermined number. Groups for classifying feature portions may be defined in every direction without a break for every predetermined range of angle, for example, every 10 degrees of edge angle, or may be concentrated in a specific range of angle.

In S305, the feature portion evaluation unit 104 selects an image capturing apparatus 109 to be checked.

In S306, the feature portion evaluation unit 104 selects an angle to be checked.

In S307, with respect to the image capturing apparatus 109 to be checked selected in S305, the feature portion evaluation unit 104 determines whether the number of feature portions classified into a group having an edge angle equal to the angle to be checked selected in S306 satisfies a predetermined condition. As an angle and an image capturing apparatus 109 to be checked, all angles and all image capturing apparatus 109 may be selected, or only a specific range of angle or a specific image capturing apparatus 109 for which a user has predicted occurrence of a problem may be selected. In the present embodiment, the processing proceeds to S308 if the number of feature portions in a group having an edge angle equal to the angle to be checked is equal to or less than a predetermined threshold in S307, and proceeds to S309 if the number exceeds the predetermined threshold.

In S308, the reference image that was used for selection of feature portions, the edge angle of the group in which the number of feature portions is equal to or less than the predetermined threshold, and the number of feature portions are added as feature portion information to a target to be notified.

In S309, with respect to the image capturing apparatus 109 to be checked selected in S305, the feature portion evaluation unit 104 determines whether the determination processing in S307 has been finished for all angles to be checked. In the present embodiment, the processing proceeds to S310 if the determination processing in S307 has been finished for all angles to be checked, and proceeds to S306 if the processing has not been finished.

In S310, the feature portion evaluation unit 104 determines whether the determination processing in S307 has been finished for all image capturing apparatus 109. In the present embodiment, the processing proceeds to S311 if the determination processing in S307 has been finished for all image capturing apparatus 109 to be checked, and proceeds to S305 if the processing has not been finished.

In S311, if there is a reference image added to a target to be notified in S308, the feature portion information output unit 105 outputs the reference image to be notified and the feature portion information including information about reliability of feature portions to the display unit 108. Information about reliability of feature portions displayed on the display unit 108 may be feature portion information processed and rendered by the rendering unit 107 in a form easily visible to a user. In addition, information for specifying an image capturing apparatus 109 which captured the reference image to be notified may be included in the information about reliability of feature portions displayed on the display unit 108, whereby a user can easily specify the image capturing apparatus 109 requiring improvement.

As a result of evaluation by the feature portion evaluation unit 104, if sufficient features have been obtained from the reference image, the feature portion information is output to a control module of an image capturing apparatus 109 corresponding to the reference image in S312.

The item to be aggregated in S304 is the number of feature portions at each angle in the present embodiment. In addition to this, dispersion of coordinates of feature portions in X and Y directions, an edge intensity of each feature portion, and the like may be aggregated. That is, even if the number of feature portions satisfies the criterion, in a case where their distribution is uneven, for example, in a case where many feature portions are located at the upper left corner, it is difficult to detect a displacement in the direction of rotation round the upper left corner in many feature portions. Accordingly, dispersion of coordinates of feature portions in the X and Y directions may be aggregated and if there is unevenness over a certain level, a user may be notified of information indicating unevenness as well as the information about reliability of feature portions. Further, for each feature portion, information indicating an edge intensity may be aggregated in addition to a position and an edge angle such that the necessary number of feature portions is changed according to the edge intensity and a user is notified of a feature portion with a low edge intensity as well as the information about reliability of feature portions.

Figure 4A:
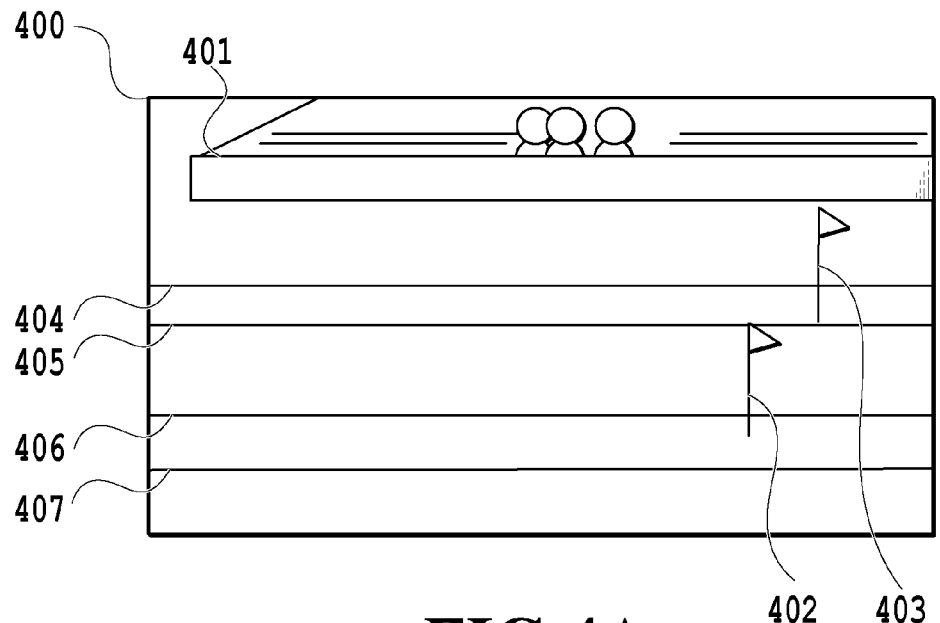
FIG. 4A is a diagram showing an example of a captured image used as a reference image by the image processing apparatus according to the embodiment.
Figure 4B:
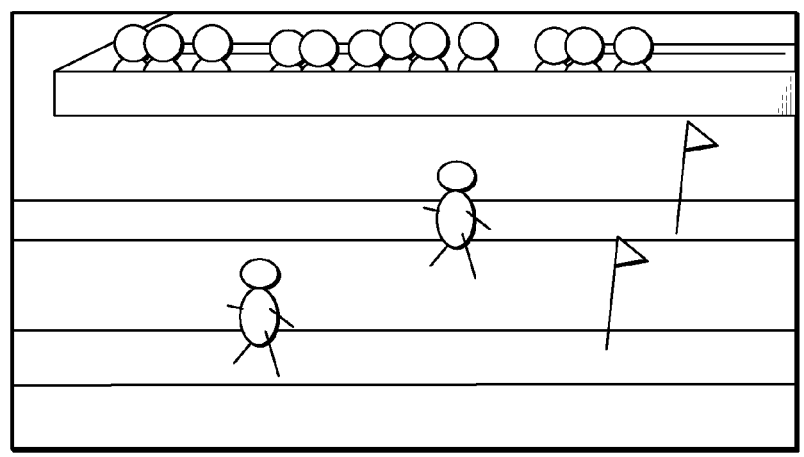
FIG. 4B is a diagram showing an example of a captured image used as a reference image by the image processing apparatus according to the embodiment.

FIGS. 4A and 4B show an example of a captured image used as a reference image by the image processing apparatus 100 according to the present embodiment. FIG. 4A is an example of a reference image 400 captured by the image capturing apparatus 109 in the orientation at the time of image capturing apparatus calibration. It is assumed that a building 401, flags 402 and 403, and lines 404 to 407 are seen in the reference image 400 of FIG. 4A. FIG. 4B is an example of a captured image output from the image capturing apparatus 109 after calibration.

In the present embodiment, two groups of 0±5° and 90±5° are provided, the number of feature portions is aggregated only for these groups, and the feature portion evaluation unit 104 detects a case where the number of feature portions in each group is three or less.

FIG. 6A shows an example of feature portion information output from the image processing apparatus 100 in a case where the feature portion selection unit 103 selects a feature portion from the reference image 400 of FIG. 4A in S303 of FIG. 3.

Feature portion information 600 of the present embodiment has an ID 601 for identifying a selected feature portion, coordinates 602 of the feature portion in the reference image 400, and an angle 603 of a representative edge of the image in the feature portion. In the present embodiment, it is assumed that a feature portion is rectangular and has a fixed size and the coordinates 602 of a feature portion indicate coordinates of the upper left corner of the rectangle. However, the feature portion is not limited to this. The feature portion may have a shape other than a rectangle and the coordinates 602 may indicate the center coordinates of a feature portion. Feature portion data 610 to 618 is aggregated by the feature portion evaluation unit 104 in S304 of FIG. 3 to record the number 621 of feature portions in each group 620 shown in FIG. 6B. A group 630 of 0° is a group of feature portions having angles of 0±5° in the feature portion data included in the feature portion information 600. A group 631 of 90° is a group of feature portions having angles of 90±5° included in the feature portion information 600.

Feature portions classified into the group 630 of 0° are the following three: feature portion data 610, feature portion data 615, and feature portion data 617. In the present embodiment, since a case where the number of feature portions is three or less is a target to be detected, the feature portion data included in the group 630 of 0° is a target to be notified.

Figure 5:
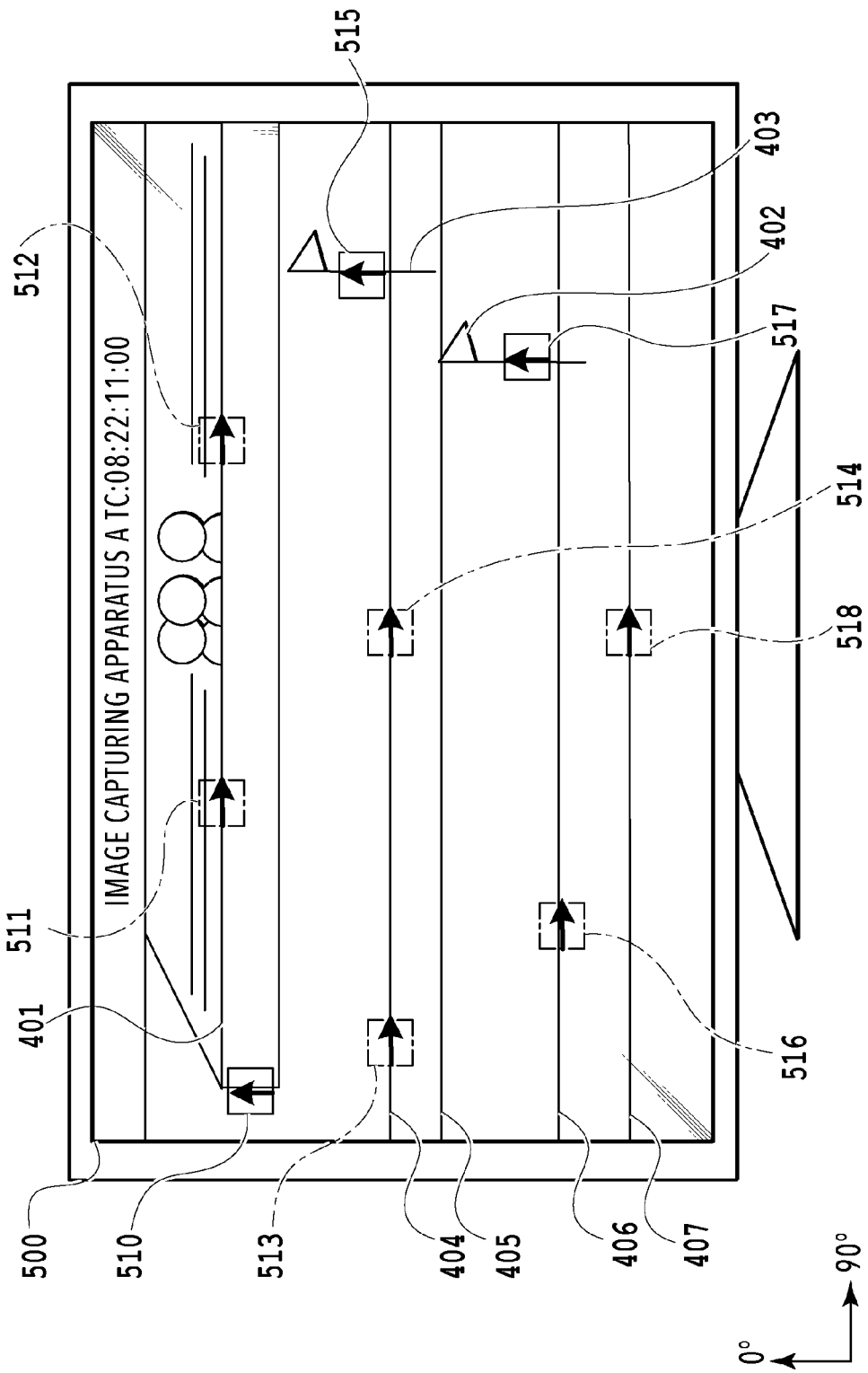
FIG. 5 is a diagram showing an example of display information generated by the image processing apparatus according to the embodiment.

FIG. 5 shows an example of display information generated by the rendering unit 107 of the image processing apparatus 100 according to the first embodiment. The rendering unit 107 of the present embodiment renders markers 510 to 518 indicating feature portions on the reference image 400 based on information described in the feature portion information 600.

Markers 510, 517, and 515 indicate feature portions to be notified classified into the group 630 of 0° shown in FIG. 6B. With reference to the markers displayed on the reference image 400, a user determines whether objects selected as feature portions are stably usable until the completion of capturing of virtual viewpoint video.

If no measures are taken, in the outdoor environment as shown in FIG. 4B, flags 402 and 403 may be moved from the positions on the reference image 400 by the wind or contact with a person. By displaying display information 500 on the display unit 108, a user can easily improve the objects to be feature portions and the arrangement of the image capturing apparatus 109 and select feature portions more suitable for vibration correction.

For example, it is considered that the arrangement of objects is improved such that more objects to be candidates for feature portions of 0° are seen. As a specific example of improvement in arrangement, it is considered that objects in which an edge angle in the vertical direction is detected are provided within an angle of view of the image capturing apparatus 109. It is also considered that a wider range is captured so as to include objects in which an edge angle in the vertical direction is detected and which are located closer to the image capturing apparatus 109. Further, the flags 402 and 403 may be fixed so as to prevent movement or something like poles resistant to the influence of the wind may be used instead of the flags 402 and 403.

The present embodiment visualizes information about reliability of feature portions such as the positions and angles of feature portions having a possibility of a problem out of a number of feature portions selected for each image capturing apparatus. Thus, a user can easily specify the state of objects to be improved. Accordingly, feature portions can be efficiently verified with respect to each image capturing apparatus. In a system using a number of image capturing apparatus, an image capturing apparatus requiring improvement can be found in a short time.

In addition, since information about reliability of feature portions is referred to, it can be determined with higher certainty whether suitable vibration correction can be performed. Accordingly, in a case where there are a number of feature portions but many of the feature portions are based on a captured image of unstable objects, a decrease in accuracy of vibration isolation can be prevented by, for example, masking feature portions having low reliability and corresponding objects such that they are not used for vibration isolation correction. Even in a case where there are a few usable feature portions, it is not necessary to make an effort to increase the number of feature portions as long as there are a required number of stable feature portions.

Second Embodiment

In the second embodiment of the present disclosure, in a case where it is difficult for a user to add constraints or changes to objects, feature portions designated by a user such as selected unstable feature portions can be excluded from feature portions used for vibration isolation control.

Among objects selected as feature portions shown in the display information 500, the flags 402 and 403 are likely to move easily by the wind or the like, whereas the building 401 does not easily move. This example shows a case where only stable feature portions of the building 401 are used for vibration isolation control in the horizontal direction to remove the influence of movement of the flags 402 and 403.

Feature portion information corresponding to a feature portion 517 on the flag 402 is the feature portion data 617, feature portion information corresponding to a feature portion 515 on the flag 403 is the feature portion data 615, and feature portion information corresponding to a feature portion 510 at the left end of the building 401 is the feature portion data 610.

In the image processing apparatus 100 according to the present embodiment, a marker corresponding to feature portion data displayed as the display information 500 on the display unit 108 can be enabled or disabled by the operation of the operation input unit 106 such as a mouse-click or selection on a touch panel. In a case where an instruction to disable the feature portion data 615 and 617 is issued via the operation input unit 106, information indicating disablement of the feature portion data 615 and 617 is fed back to the feature portion selection unit 103. The feature portion selection unit 103 deletes the feature portion data 615 and 617 from the feature portion data corresponding to the selected feature portions and outputs feature portion information about the remaining feature portion data 610 to 614, 616, and 618 to the feature portion information output unit 105.

The image processing apparatus 100 according to the present embodiment comprises a UI which enables selection of an area of the reference image 400 via the operation input unit 106 with respect to the feature portion data displayed on the display information 500. A user can select one or more feature portions to be deselected or one or more feature portions to be selected by selecting an area of the reference image 400 via the operation input unit 106 such as a stylus, mouse, or key. An area selected by a user is fed back to the feature portion selection unit 103. For example, in a case where a deselection area including a feature portion to be deselected is selected by a user, the feature portion selection unit 103 deletes the feature portion corresponding to the deselection area from the selected feature portions and outputs feature portion information about the rest of the feature portions to the feature portion information output unit 105.

As another method for excluding a feature portion, the feature portion selection unit 103 may rescan the reference image 400 exclusive of the deselection area and reselect detected feature portions.

Third Embodiment

In the third embodiment of the present disclosure, a user can designate a feature portion to be excluded in a form different from the second embodiment.

The image processing apparatus 100 of the present embodiment comprises a UI which is displayed on the display unit 108 and is user-operable via the operation input unit 106. A user can designate a deselection area by enclosing or filling an object to be excluded on the reference image 400 with a stylus or the like. The rendering unit 107 performs image processing for rendering a reference image in which the designated deselection area is masked with an image not satisfying the requirement for a feature portion.

An example of the image processing performed by the rendering unit 107 of the image processing apparatus 100 is image processing of filling the deselection area designated by a user with a single color and blurring the boundary between the deselection area and the reference image 400 surrounding it. This processing enables exclusion of an undesirable object from the reference image 400. In addition, the processing makes it possible to avoid the situation where an edge having an edge intensity higher than that recognized as a feature portion is generated in the boundary of a selection target area in the masked reference image 400 and an object that was not present in the original reference image is selected as a false feature portion. The reference image thus partially masked is input to the feature portion selection unit 103 and feature portions are reselected, thereby obtaining feature portions not including a feature portion based on an undesirable object.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

According to the present disclosure, user convenience can be improved as to adjustment for vibration correction of a captured image captured by an image capturing apparatus.

This application claims the benefit of Japanese Patent Application No. 2019-234368 filed Dec. 25, 2019, which is hereby incorporated by reference wherein in its entirety.

What is claimed is:

1. An image processing apparatus comprising:
one or more memories storing instructions: and
one or more processors executing the instructions to:
acquire a captured image from an image capturing apparatus;
select feature portions, which are image areas used for alignment of the captured image with a different captured image of the image capturing apparatus, in the acquired captured image, the image areas being different from each other in the acquired captured image and each of the feature portions being one of the image areas in the acquired captured image;
classify the selected feature portions into a plurality of groups, each of the selected feature portions being classified into one of the plurality of groups;
count a number of feature portions classified to one of the plurality of groups, each of the classified feature portions being one of the image areas in the acquired captured image; and
present information about a specific group and the number of feature portions classified into the specific group being less than a threshold value,
wherein the selected feature portions are classified into any one of the plurality of groups based on an edge angle of the selected feature portions, and the information about the specific group includes information about the number of feature portions classified into the specific group and information about an edge angle corresponding to the specific group.

2. The image processing apparatus according to claim 1, wherein the acquired captured image is a captured image captured in an orientation at a time of calibration of the image capturing apparatus.

3. The image processing apparatus according to claim 1, wherein in each of the feature portions, a maximum edge intensity in the image area in the captured image is equal to or higher than a predetermined edge intensity.

4. The image processing apparatus according to claim 1, wherein the information about the specific group includes information about the number of the feature portions classified into the specific group.

5. The image processing apparatus according to claim 1, wherein, the information is presented by:
rendering a display indicating the information in the captured image; and
displaying the captured image in which the display indicating the information about the specific group is rendered.

6. The image processing apparatus according to claim 1, the one or more processors further execute the instructions to set an additional criterion for selection of the feature portions.

7. The image processing apparatus according to claim 6, wherein the additional criterion is a criterion for designating the feature portions whose the selection is to be disabled.

8. The image processing apparatus according to claim 6, wherein the additional criterion includes a definition of a deselection area including a feature portion whose the selection is to be disabled in the captured image.

9. The image processing apparatus according to claim 6, wherein the additional criterion includes a definition of a deselection area in which the feature portions are not selected in the captured image, and
the feature portions from the captured image exclusive of the deselection area is reselected.

10. The image processing apparatus according to claim 9, the one or more processors further execute the instructions to render a mask in the deselection area of the captured image,
wherein the feature portions based on the captured image in which the mask is rendered is reselected.

11. The image processing apparatus according to claim 1, wherein the information about the specific group is presented in a case where the counted number of the feature portions is less than the threshold value.

12. An image processing method comprising:
  acquiring a captured image from an image capturing apparatus;
  selecting feature portions, which are image areas used for alignment of the captured image with a different captured image of the image capturing apparatus, in the acquired captured image, the image areas being different from each other in the acquired captured image and each of the feature portions being one of the image areas in the acquired captured image;
  classifying the selected feature portions into a plurality of groups, each of the selected feature portions being classified into one of the plurality of groups;
  count a number of feature portions classified to one of the plurality of groups, each of the classified feature portions being one of the image areas in the acquired captured image; and
  presenting information about a specific group and the number of feature portions classified into the specific group being less than a threshold value,
  wherein the selected feature portions are classified into any one of the plurality of groups based on an edge angle of the selected feature portions, and the information about the specific group includes information about the number of feature portions classified into the specific group and information about an edge angle corresponding to the specific group.

13. A non-transitory computer readable storage medium storing a program causing a computer to execute an image processing method, the image processing method comprising:
  acquiring a captured image from an image capturing apparatus;
  selecting feature portions, which are image areas used for alignment of the captured image with a different captured image of the image capturing apparatus, in the acquired captured image, the image areas being different from each other in the acquired captured image and each of the feature portions being one of the image areas in the acquired captured image;
  classifying the selected feature portions into a plurality of groups, each of the selected feature portions being classified into one of the plurality of groups;
  count a number of feature portions classified to one of the plurality of groups, each of the classified feature portions being one of the image areas in the acquired captured image; and
  presenting information about a specific group and the number of feature portions classified into the specific group being less than a threshold value,
  wherein the selected feature portions are classified into any one of the plurality of groups based on an edge angle of the selected feature portions, and the information about the specific group includes information about the number of feature portions classified into the specific group and information about an edge angle corresponding to the specific group.

* * * * *